Dec. 2, 1958  F. W. MEREDITH ET AL  2,863,142
NAVIGATIONAL INSTRUMENTS
Filed July 13, 1955  3 Sheets-Sheet 1
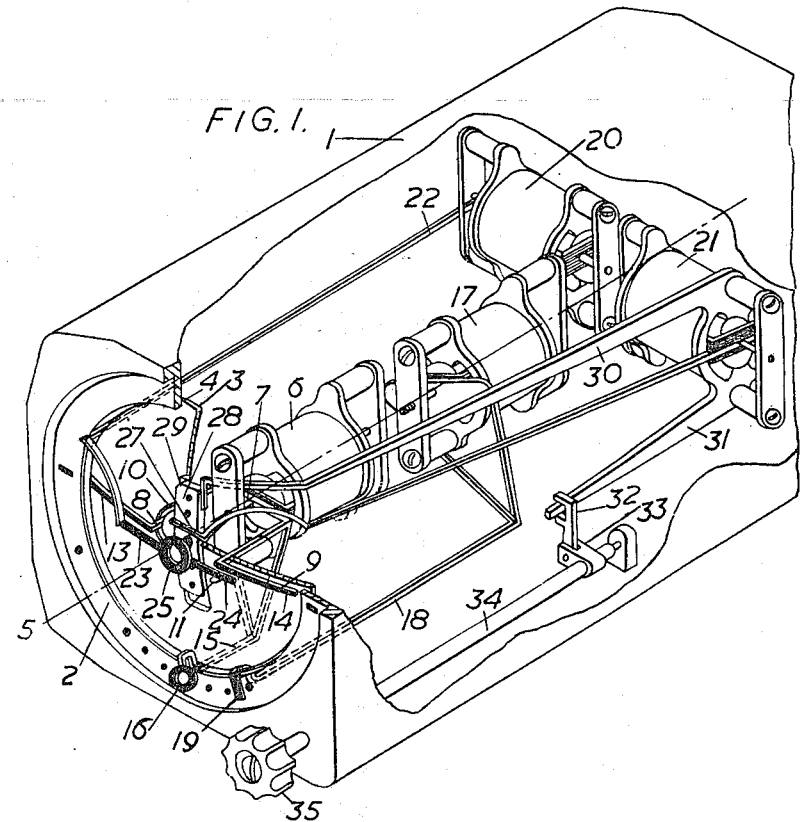
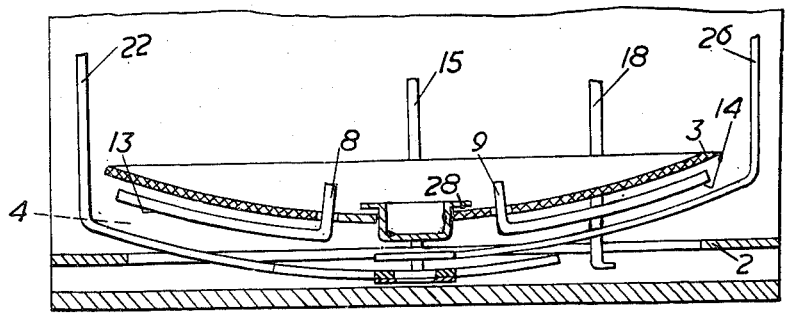
Inventors
F. W. Meredith &
A. M. A. Majendie
By Moore & Hall
Attorneys Dec. 2, 1958  F. W. MEREDITH ET AL  2,863,142
NAVIGATIONAL INSTRUMENTS
Filed July 13, 1955  3 Sheets-Sheet 2
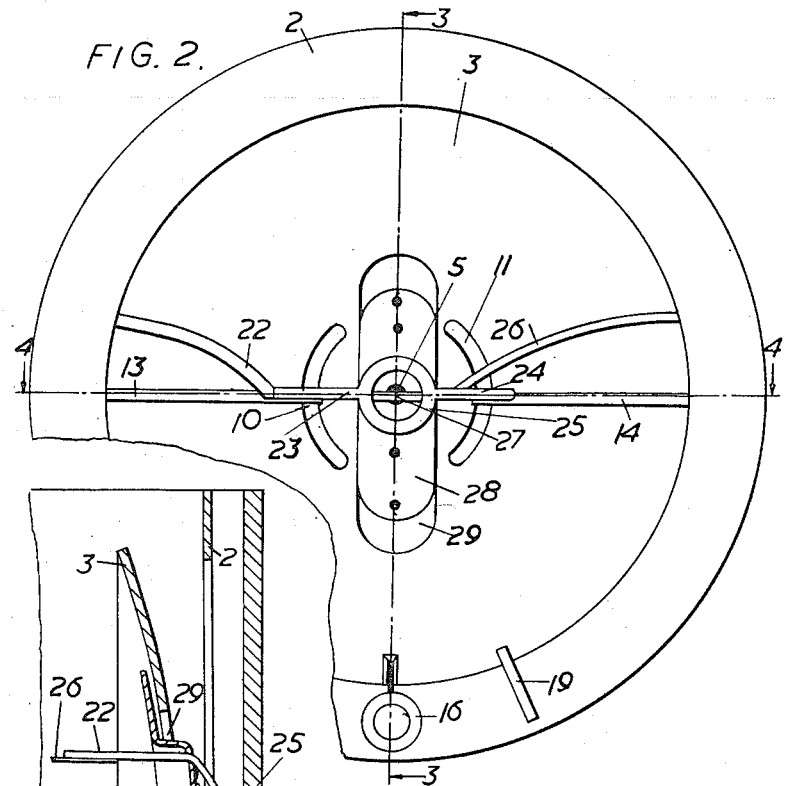
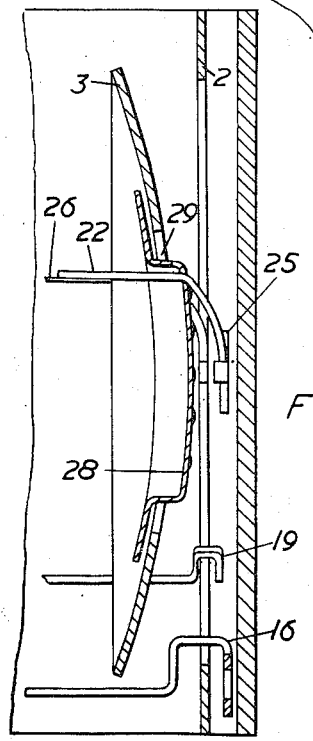
F. W. MEREDITH
A. M. A. MAJENDIE
Inventors
By Moore & Hall
Attorneys

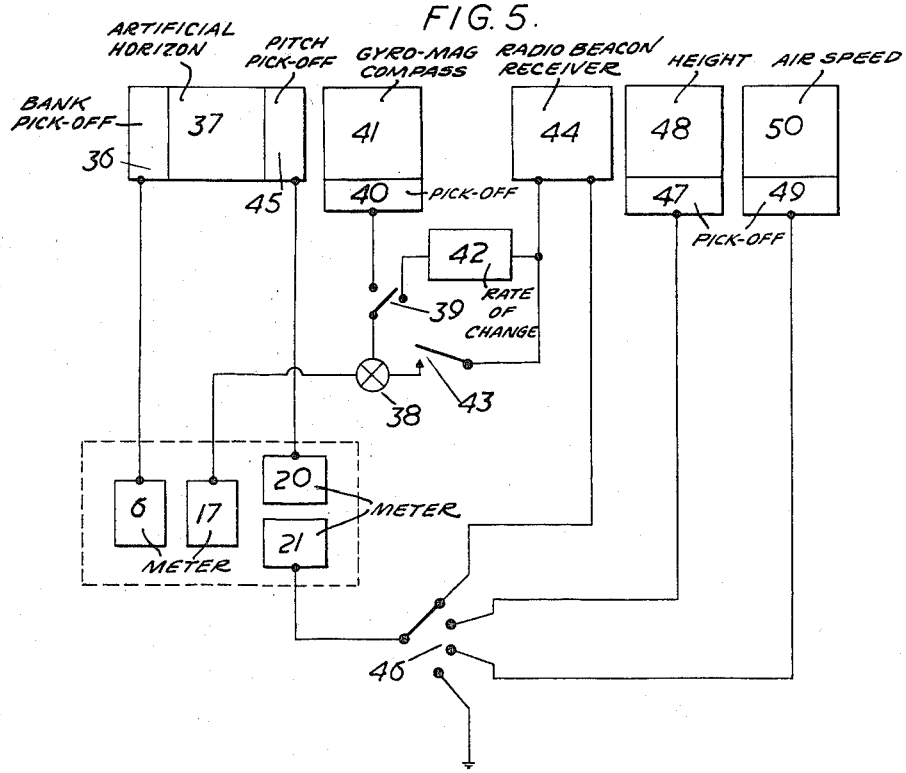

2,863,142

NAVIGATIONAL INSTRUMENTS

Frederick William Meredith, Cheltenham, and Alastair Michael Adair Majendie, Cookham Dean, England, assignors to Smiths America Corporation, Ruxton, Md.

Application July 13, 1955, Serial No. 521,857

Claims priority, application Great Britain July 16, 1954

19 Claims. (Cl. 343—107)

The present invention relates to navigational instruments for aircraft, and is concerned with the provision of an instrument to facilitate control of an aircraft to bring it to, or maintain it upon, a desired path, for example a compass course, or a track defined by a radio beacon.

It has previously been proposed to provide an instrument having a pointer displaced from a datum position in accordance with the sum of signals dependent respectively upon departure of the aircraft in bank from level flight, the displacement of the aircraft from the path and the rate of approach of the aircraft to the path, the magnitudes and senses of the signals being such that if the aircraft is steered in a manner to maintain the pointer in its datum position (and thus the sum at zero), it will approach or be maintained upon the path as the case may be.

Some difficulty has arisen in the past in the use of such an instrument. One difficulty is caused by the presence of random fluctuation or noise in certain of the signals, particularly when derived from a radio beacon, and the pilot has no means of knowing, except by the inspection of further instruments, such as a conventional artificial horizon, whether fluctuation of the pointer is due to noise or to actual motion of the aircraft. Also the pilot wishes to be aware of the actual attitude of the aircraft, which, with the instrument referred to, again necessitates the inspection of a conventional artificial horizon or the like.

According to the present invention we provide an instrument for use upon an aircraft having first and second indices, means to rotate the first index in a plane about an axis normal to that plane in accordance with bank of the aircraft, the said first and second indices being so shaped and disposed that their relative angular position provides a representation of the bank attitude of the aircraft relative to the horizon, a first pointer linked to the first index and thus displaced from a datum position in accordance with bank, a second pointer, and means to displace the second pointer from the datum position in accordance with a demanded bank attitude, the displacements of the first and second pointers being such that when they are coincident the desired bank attitude is attained.

Preferably the first index represents the horizon, so that the presentation provided by the first and second indices is equivalent to the bank presentation provided by a conventional gyroscopic artificial horizon.

The first pointer is preferably solidly attached to the first index and is disposed near the earlier mentioned plane. It is also preferably so disposed that when the instrument is mounted in its normal viewing position it is substantially vertically below the earlier mentioned axis when the bank is zero. The presentation provided by the first and second pointers then calls for an instinctive response, e. g. if the first pointer is to the right of the second left bank is called for.

The second pointer displacement will be determined by the path which the aircraft is to follow. If the aircraft is to follow a desired compass course the displacement will be proportional to the deviation between the aircraft's actual heading and that required to follow the selected course. If the aircraft is to follow a radio track the displacement will be proportional to the sum of signals respectively proportional to the displacement from the track and the rate of approach to the track, i. e. either to the rate of change of the displacement signal or to the deviation between the aircraft's actual heading and that required to follow the selected track.

Preferably means are provided to displace the second index from a further datum position in accordance with displacement of the aircraft from a datum attitude in pitch, in a direction at right angles to the position assumed by the first "index" for zero bank.

Preferably in the further datum position the second index lies substantially on the axis mentioned so that the first and second indices provide a display precisely similar to that provided by a conventional gyroscopic artificial horizon of both pitch and roll attitude.

Preferably a pitch demand pointer is also provided, together with means to displace it in accordance with demanded pitch attitude, the displacements of the second index and the pitch demand pointer being such that when they are coincident the demanded pitch attitude is attained.

Preferably also a pitch scale having a datum thereon is provided to co-operate with the second index and pitch demand pointer, and means are provided to displace the pitch scale and pitch demand pointer by equal amounts in the same sense, so that if it is desired to fly at a set pitch attitude the pitch scale and pitch demand pointer can be set accordingly.

An instrument constructed in accordance with the invention will now be described with reference to the accompanying drawings of which:

Figure 1 shows a pictorial view of the instrument with part of the case etc. broken away.

Figure 2 shows a view of the dial and pointers of the instrument from the front.

Figure 3 shows a section on line 3—3 of Figure 2.

Figure 4 shows a section on line 4—4 of Figure 2.

Figure 5 shows schematically the connections from various devices to the meters shown in Figure 1.

The instrument comprises a conventional case 1, open at one end, the front, except for a conventional viewing window. It is to be understood that when the references are hereinafter made to horizontal and vertical directions the case 1 is considered to be in its normal viewing position. A fixed annular bank scale 2 (which is black with luminized scale markings) is situated adjacent the front, being centred about the axis of the case indicated at 5. A black mask 3 in the shape of part of the surface of a sphere, is positioned behind the annular scale 2, there being an annular gap 4 between the mask and scale.

A first milliammeter 6 is situated immediately behind mask 3, its spindle 7 lying along axis 5. The pointer of meter 6 has two parts 8 and 9 which are cranked and pass through arcuate slots 10 and 11 on either side of the centre of the mask. The parts of 8 and 9 lying in front of mask 3 are in the form of horizontal luminized bars 13, 14 whose line passes through axis 5. Bars 13, 14 constitute the first index. The bars are horizontal when zero current passes through meter 6. The pointer of meter 6 also has a third part 15 which passes through gap 4. Its end portion is bent as indicated to lie over and parallel to scale 2 and is in the form of a luminized ring 16, the "bank ring," constituting the first pointer. When 13 and 14 are horizontal 16 lies vertically below axis 5.

A second milliammeter 17 is situated immediately behind meter 6, its spindle lying along axis 5. The pointer 18 of meter 17 also passes through gap 4, the end being bent over, as indicated, to lie over and parallel to scale 2 and being in the form of a luminized line 19 lying radially with respect to the scale, the "steering director needle," constituting the second pointer. In the zero position of both meter 6 and meter 17 line 19 lies along a diameter of ring 16.

Third and fourth milliammeters 20 and 21 lie behind meter 17, with their spindles in a horizontal line passing through axis 5.

The pointer 22 of meter 20 passes through gap 4, the part lying in front of mask 3 being bent to lie parallel to the mask, and in front of bars 13 and 14. The end part of pointer 22 has the form of a further luminized ring 25, the "pitch ring," with short horizontal bars 23, 24 on either side. Bars 23, 24 and ring 25 constitute the second index. In the zero position of meter 21 ring 25 is centred about axis 5.

Pointer 26 of meter 21 extends through space 4 in a similar fashion to pointer 22. The end portion 27 of pointer 26 is horizontal and is luminized, forming the "pitch director needle" (the pitch demand pointer mentioned earlier). It lies between ring 25 and a pitch scale indicated at 28 having a black background and luminized scale, which protrudes through a slot 29 formed in mask 3, extending approximately to the level of bars 13 and 14 (see Figures 3 and 4) to reduce the effects of parallax between 25 and 27 and the scale. Pitch scale 28 is carried on an arm 30 attached to the body of meter 21. The body of meter 21 is pivoted about the spindle axis. It carries a further arm 31 engaged by one end of a link 32 whose other end is pivotally attached to an arm 33. Arm 33 is carried by a shaft 34 journalled in suitable bearings for rotation about an axis parallel to axis 5, being positioned by knob 35, the "pitch scale setting knob." Thus, by appropriate setting of knob 35 needle 27 and scale 28 may be moved without effecting their relative positions. When scale 28 is in its zero position, corresponding to a level pitch attitude, its central mark, the "pitch scale datum," lies on axis 5.

It should be pointed out that the various pointer parts visible from the front of the instrument other than those stated to be luminized are blackened, so as not to be confusingly apparent against the mask and scales.

The first milliammeter 6 is connected to an electrical bank pick-off, indicated by block 36, upon a conventional artificial horizon mounted upon the aircraft and indicated by block 37. 13, 14 and 16 are thus moved from their datum position in accordance with bank of the aircraft.

The second milliammeter 17 is connected to the output of a signal adding device, indicated as a differential 38. One input to 38 is connected to a two-position selector switch 39. One selector switch input is connected to an electrical pick-off indicated at 40 operated by a gyromagnetic compass (such as is for example described in British specification No. 586,506) indicated at 41. Pick-off 40 is adjustable, so that it may be set to give an output varying in magnitude and sign with deviation of aircraft heading from a selected heading. The other selector switch input is connected to the output of a device 42, giving an output in accordance with rate of change of angular displacement of the aircraft with respect to a selected radio track. The second input to 38 is connected, through a switch 43, to one output of a beacon receiver 44 such as is used in the well known "ILS" system. This output from receiver 44 is in accordance with the angular displacement in azimuth (measured as at the radio beacon ground station) between the aircraft and a selected track, and is also applied to the input of device 42. Device 42 is thus a differentiating device, and may be of any convenient kind.

The third milliammeter 20 is connected to an electrical pitch pick-off 45 upon artificial horizon 37. Bars 23 and 24 and ring 25 are thus moved in accordance with departure of the aircraft from a level attitude in pitch. The fourth milliammeter 21 is connected to the output of a four-position selector switch 46. The first input to switch 46 is connected to the second output of radio beacon receiver 44, and is in accordance with angular displacement in pitch of the aircraft from a glide path determined by a beacon ground station as measured at the ground station. The second input to switch 46 is connected to an electrical pick-off 47 actuated by a height responsive device (such as a barometric capsule) indicated at 48. Pick-off 47 may be set to give a signal in accordance with deviation of the aircraft from a selected height. The third input to switch 46 is connected to an electrical pick-off device 49 operated by an air-speed responsive device (such as a conventional pressure-operated air speed indicator) indicated at 50. Pick-off 49 may be set to give a signal in accordance with deviation of the aircraft from a selected air speed. The fouth input to switch 46 is earthed. Although only single line connections have been shown in Figure 5 from the various signal generating devices to the meters 6, 17, 20 and 21 it is to be understood that the electrical circuit is completed through appropriate return circuits which have been omitted for clarity.

It will be seen that bars 13 and 14 and bars 23 and 24 and ring 25 provide a display of aircraft attitude precisely equivalent to that provided by a conventional artificial horizon.

The position of steering director needle 19 is indicative of the bank attitude required if the aircraft is to be brought to, or maintained in, a desired condition of flight in azimuth. Thus, if it is desired to fly upon a desired compass course, pick-off 40 is set in accordance with the heading of that course (corrected for drift if necessary), switch 39 is set to apply the output from pick-off 40 to differential 38 and switch 43 is opened. Then if the aircraft is maneuvered in bank so that ring 16 lies with a diameter over needle 19, the aircraft will be steered in a manner to bring it to the desired course. If it is desired to fly upon a radio track, receiver 44 is adjusted to give a signal at its first output in accordance with angular deviation from the track and, switch 43 is closed. Either switch 39 is set to connect pick-off 40 to differential 38, and pick-off 40 set to give a signal in accordance with deviation of the aircraft from the (known) heading of the track, or switch 39 is set to connect device 42 to differential 38. The first alternative is usually preferable, as the output from receiver 44 almost inevitably has a substantial amount of relatively high frequency noise superimposed upon it, which is accentuated by device 42. A signal from either 40 or 42 however is essential if oscillation of the aircraft from side to side of the radio track is to be avoided.

The position of pitch director needle 27 is indicative of the pitch attitude required if the aircraft is to be brought to, or maintained in, a desired condition of flight in pitch. Thus if it is desired to fly at a constant pitch attitude, switch 46 will be set in its fourth position (so that needle 27 lies over the zero of the pitch scale), knob 35 adjusted to displace the pitch scale appropriately from its zero position (if flight in an attitude other than level is required) and the aircraft controlled in pitch so that ring 25 lies with its horizontal diameter over needle 27, and also over the central mark on scale 28. If it is desired to follow a glide path, receiver 44 is appropriately adjusted, switch 46 set in its first position and knob 35 set in accordance with the (known) pitch attitude appropriate to the glide path. If it is desired to maintain a certain height or air speed, switch 46 will be set in its second or third position, pick-off 47 or 49, as the case may be and the pitch scale datum, set appropriately.

While there have been described above what are at present believed to be the preferred forms of the invention, other forms will suggest themselves to those skilled in the art. All such variations as fall within the true spirit of the invention are intended to be covered by the generic terms of the claims set forth below.

We claim:

1. An instrument for use upon an aircraft comprising first and second indices, means to rotate the first index in a plane about an axis normal to that plane in accordance with bank of the aircraft, the said first and second indices being so shaped and disposed that their relative angular position provides a representation of the bank attitude of the aircraft relative to the horizon, a first pointer linked to the first index and thus displaced from a datum position in accordance with bank, a second pointer, and means to displace the second pointer from the datum position in accordance with a demanded bank attitude, the displacements of the first and second pointers being such that when they are coincident the desired bank attitude is attained.

2. An instrument as claimed in claim 1 wherein the first index is arranged to represent the horizon.

3. An instrument as claimed in claim 2 wherein the first pointer is rigidly attached to the first index.

4. An instrument as claimed in claim 3 wherein the first pointer is so disposed that when the instrument is in its normal viewing position it is substantially vertically below the axis about which the first index rotates when the bank is zero.

5. An instrument as claimed in claim 1 comprising means to displace the second pointer in accordance with deviation between the aircraft heading and the heading required to follow a desired compass course.

6. An instrument as claimed in claim 1 comprising means to displace the second pointer in accordance with the sum of signals respectively proportional to the displacement of the aircraft from a radio track and the rate of approach of the aircraft to the track.

7. An instrument as claimed in claim 6 wherein the signal proportional to the rate of approach of the aircraft to the track is proportional to the deviation between the actual heading of the aircraft and the heading required to follow the track.

8. An instrument as claimed in claim 6 wherein the signal proportional to the rate of approach of the aircraft to the track is proportional to the rate of change of the displacement signal.

9. An instrument as claimed in claim 1 comprising means to displace the second index from a further datum position in accordance with displacement of the aircraft from a datum attitude in pitch in a direction at right angles to the position assumed by the first index for zero bank.

10. An instrument as claimed in claim 9 wherein the further datum position lies on the axis about which the first index is rotated.

11. An instrument as claimed in claim 9 comprising also a pitch demand pointer and means to displace the pitch demand pointer in accordance with demanded pitch attitude, the displacements of the second index and the pitch demand pointer being such that when they are coincident the demanded pitch attitude is attained.

12. An instrument as claimed in claim 11 comprising also a pitch scale to co-operate with the second index and pitch demand pointer and means to displace the pitch scale and pitch demand pointer by equal amounts in the same sense.

13. An instrument as claimed in claim 11 comprising means to displace the pitch demand pointer in accordance with deviation of the aircraft from a radio glide path.

14. An instrument as claimed in claim 13 comprising means to displace the pitch demand pointer in accordance with deviation of the aircraft from a selected height.

15. An instrument as claimed in claim 13 comprising means to displace the pitch demand pointer in accordance with deviation of the aircraft from a selected air speed.

16. The combination set forth in claim 1, said first index comprising luminized bars, said means to rotate said first index comprising a meter, said bars being horizontal when no current passes through said meter.

17. The combination set forth in claim 16, said first pointer comprising a luminized first ring which lies directly below the axis when the current in said meter is zero.

18. The combination set forth in claim 17, said second index comprising a second ring with oppositely extending bars, said ring being centered about said axis when in zero position.

19. The combination set forth in claim 18, said second pointer comprising a luminized line member which in zero position lies along a diameter of said first ring.

References Cited in the file of this patent

UNITED STATES PATENTS 2,732,550   Reedy ---------------- Jan. 24, 1956